(12) United States Patent
Pravinchandra Bhatt et al.

(10) Patent No.: US 12,549,386 B2
(45) Date of Patent: Feb. 10, 2026

(54) MECHANISM FOR CERTIFICATE UPDATES

(71) Applicant: Nokia Technologies Oy, Espoo (FI)

(72) Inventors: Rakshesh Pravinchandra Bhatt, Bangalore (IN); Pramod P Pillai, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 802 days.

(21) Appl. No.: 17/727,224

(22) Filed: Apr. 22, 2022

(65) Prior Publication Data
US 2023/0344652 A1    Oct. 26, 2023

(51) Int. Cl.
*H04L 9/32* (2006.01)
*G06N 20/00* (2019.01)
*H04L 9/08* (2006.01)

(52) U.S. Cl.
CPC ........... *H04L 9/3268* (2013.01); *G06N 20/00* (2019.01); *H04L 9/0891* (2013.01); *H04L 9/3297* (2013.01)

(58) Field of Classification Search
CPC ... H04L 9/3268; H04L 9/0891; H04L 9/3297; G06N 20/00
See application file for complete search history.

(56) References Cited

U.S. PATENT DOCUMENTS

| | | | | |
|---|---|---|---|---|
| 12,137,175 B1* | 11/2024 | Sharma | ................. | H04L 9/3268 |
| 2002/0026427 A1* | 2/2002 | Kon | ........................ | G06F 21/32 |
| | | | | 705/67 |
| 2002/0099822 A1* | 7/2002 | Rubin | ................... | H04L 9/3268 |
| | | | | 709/225 |
| 2005/0071630 A1* | 3/2005 | Thornton | .............. | H04L 9/3226 |
| | | | | 713/156 |
| 2011/0126001 A1* | 5/2011 | Fu | ........................... | H04L 63/06 |
| | | | | 713/156 |
| 2017/0339144 A1* | 11/2017 | Han | ...................... | H04L 9/3268 |
| 2018/0262346 A1* | 9/2018 | Levy | ..................... | H04L 9/3268 |
| 2019/0132309 A1* | 5/2019 | Wei | ...................... | H04L 63/0823 |
| 2019/0158503 A1* | 5/2019 | Bansal | ................ | H04L 63/0272 |
| 2020/0127997 A1* | 4/2020 | Andrews | ............... | H04L 9/3268 |

(Continued)

OTHER PUBLICATIONS

M. Naor and K. Nissim, "Certificate revocation and certificate update," in IEEE Journal on Selected Areas in Communications, vol. 18, No. 4, pp. 561-570, Apr. 2000 (Year: 2000).*

(Continued)

*Primary Examiner* — Jung W Kim
*Assistant Examiner* — Sameera Wickramasuriya
(74) *Attorney, Agent, or Firm* — Ryan, Mason & Lewis, LLP

(57) ABSTRACT

Embodiments of the present disclosure relate to a method, device, apparatus and computer readable medium for certificate updates. According to embodiments of the present disclosure, a first device receives information of at least one network function. The information at least comprises certificate information of the at least one network function. The first device determines a schedule for triggering certificate update for the at least one network function using an artificial intelligence/machine learning (AI/ML) model on the first device. The first device triggers a certificate update procedure for the at least one network function according to the determined schedule. In this way, it can avoid overload in the system due to bulk certificate updates happening simultaneously.

19 Claims, 8 Drawing Sheets

(56) References Cited

U.S. PATENT DOCUMENTS

| | | | |
|---|---|---|---|
| 2021/0044579 A1* | 2/2021 | Nelson-Gal | H04L 63/062 |
| 2021/0117515 A1* | 4/2021 | Bartfai-Walcott | |
| | | | H04L 63/0823 |
| 2022/0109582 A1* | 4/2022 | Goeringer | H04L 9/3247 |

OTHER PUBLICATIONS

Wasef, Albert, Yixin Jiang, and Xuemin Shen. "DCS: An efficient distributed-certificate-service scheme for vehicular networks." IEEE Transactions on Vehicular Technology 59.2 (2009): 533-549. (Year: 2009).*

"R18 SID on Standardising Automated Certificate Management in SBA", 3GPP TSG-SA3 Meeting #103-e, S3-212390, Agenda: 5.23, BT, May 17-28, 2021, 3 pages.

"Ericsson: Expired certificate caused O2 and SoftBank outages", ZD Net, Retrieved on Apr. 25, 2022, Webpage available at : https://www.zdnet.com/article/ericsson-expired-certificate-caused-02-and-softbank-outages/.

"Millions of smartphones were taken offline yesterday by an expired certificate", The Verge, Retrieved on Apr. 25, 2022, Webpage available at : https://www.theverge.com/2018/12/7/18130323/ericsson-software-certificate-02-softbank-uk-japan-smartphone-4g-network-outage.

"Certificate Management Framework", O-RAN Alliance, 2019, pp. 1-3.

"Key Issues for the Certificate Management Framework Study", O-RAN Alliance, Retrieved on May 24, 2022, Webpage available at :https://oranalliance.atlassian.net/wiki/spaces/SFG/pages/2382823430/Key+Issues+Discussion+for+Study+for+the+Certificate+Management+Framework.

* cited by examiner

MECHANISM FOR CERTIFICATE UPDATES

FIELD

Embodiments of the present disclosure generally relate to the field of telecommunication and in particular, to methods, devices, apparatuses and computer readable storage medium for certificate updates.

BACKGROUND

In order to ensure secure communications between various network functions (NFs), a plurality of protocols are used. The secure connection establishment for many of these protocols needs digital certificate exchange between entities involved in the communication. Digital certificates are used world-wide to establish trust, and optionally for authentication, between various network entities. Certification Authorities (CA) provide these certificates with certain expiry dates. Also, various encryption and hashing algorithms used for secure connection establishment. The digital certificates include the information regarding these algorithms used, and, a public key which is used by the peer entity to validate the authenticity of the certificate. Certificates may need to be updated in following scenarios: when any digital certificate expires, or is about to expire, it needs to be renewed; there are scenarios when there could be a need to change the supported algorithms, or the keys used for the certificate. If the private key associated with the public keys distributed along with digital certificates needs to be renewed, certificate may be revoked and the entities using such certificates need to update them.

SUMMARY

In general, example embodiments of the present disclosure provide a solution for certificate updates.

In a first aspect, there is provided a first device. The first device comprises at least one processor; and at least one memory including computer program codes; the at least one memory and the computer program codes are configured to, with the at least one processor, cause the first device to: receive information of at least one network function, the information at least comprising certificate information of the at least one network function; determine a schedule for triggering certificate update for the at least one network function using an artificial intelligence/machine learning (AI/ML) model on the first device; and trigger a certificate update procedure for the at least one network function according to the determined schedule.

In a second aspect, there is provided a third device. The third device comprises at least one processor; and at least one memory including computer program codes; the at least one memory and the computer program codes are configured to, with the at least one processor, cause the third device to: receive from a first device an indication regarding a certificate of at least one network function to be updated; map the at least one network function to an identity of at least one cell; identify at least one neighbor cell of the at least one cell; and increase a coverage of the at least one neighbor cell.

In a third aspect, there is provided a method. The method comprises receiving information of at least one network function, the information at least comprising certificate information of the at least one network function; determining a schedule for triggering certificate update for the at least one network function using an artificial intelligence/machine learning (AI/ML) model on the first device; and triggering a certificate update procedure for the at least one network function according to the determined schedule.

In a fourth aspect, there is provided a method. The method comprises receiving from a first device an indication regarding a certificate of at least one network function to be updated; mapping the at least one network function to an identity of at least one cell; identifying at least one neighbor cell of the at least one cell; and increasing a coverage of the at least one neighbor cell.

In a fifth aspect, there is provided an apparatus. The apparatus comprises means for receiving information of at least one network function, the information at least comprising certificate information of the at least one network function; means for determining a schedule for triggering certificate update for the at least one network function using an artificial intelligence/machine learning (AI/ML) model on the first device; and means for triggering a certificate update procedure for the at least one network function according to the determined schedule.

In a sixth aspect, there is provided an apparatus. The apparatus comprises means for receiving from a first device an indication regarding a certificate of at least one network function to be updated; means for mapping the at least one network function to an identity of at least one cell; means for identifying at least one neighbor cell of the at least one cell; and means for increasing a coverage of the at least one neighbor cell.

In a seventh aspect, there is provided a computer readable medium. The computer readable medium comprises program instructions for causing an apparatus to perform at least the method according to any one of the above third or fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
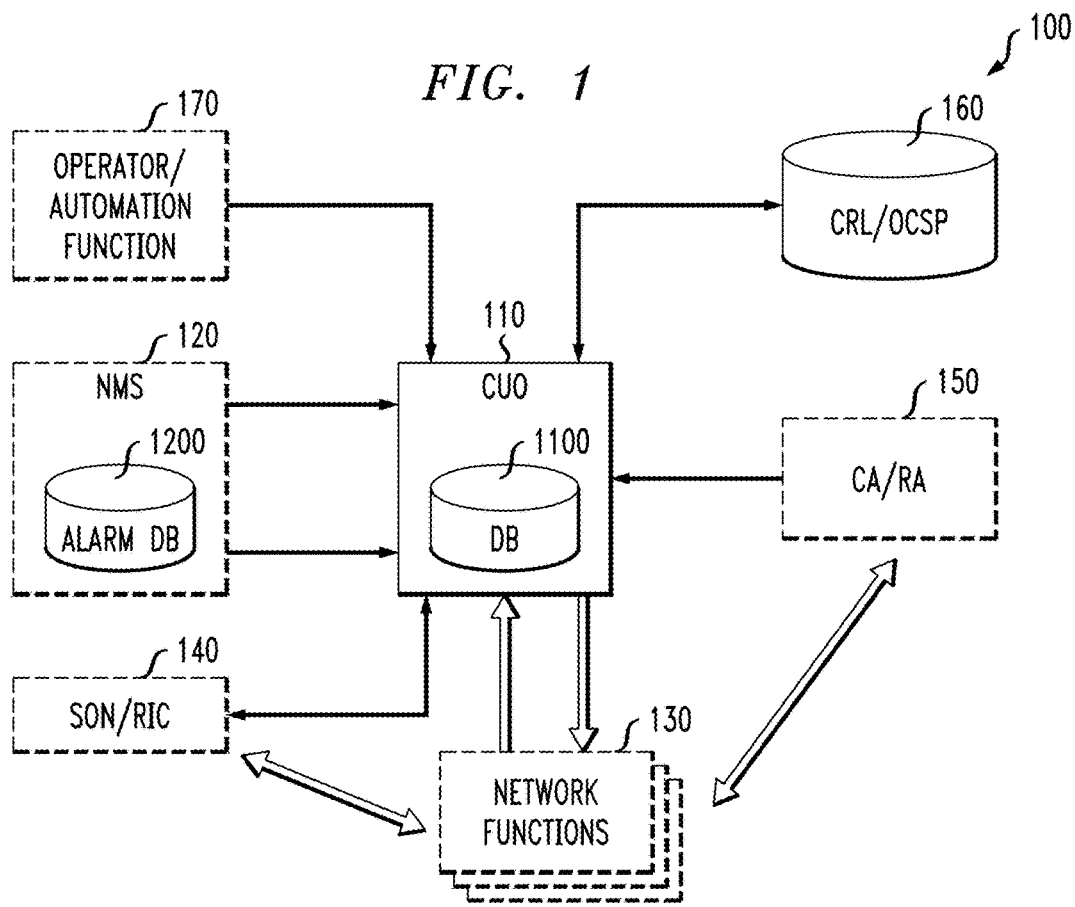
FIG. 1 illustrates a schematic diagram of a system for certificate update orchestrator in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated and Access Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. The term "terminal device" refers to any end device that may be capable of wireless communication. In the following description, the terms "terminal device", "terminal", "user equipment" and "UE" may be used interchangeably.

As mentioned above, certificates need to be updated in some scenarios. It is also likely that the private key associated with the public key shared in the digital certificate needs to be renewed. In all such scenarios, certificate may be revoked and the entities using such certificates need to update them. A 5G network may comprise millions of physical network functions, and possibly even larger number of virtual network functions, automated Certificate Management is inevitable. When multiple entities of a network require certificate updates (due to renewal or revocation), there is a possibility of system overload due to a large volume of message exchanges triggered by automated certificate management procedures.

If a huge number of network functions simultaneously require certificate renewal (due to same expiry date), it is possible that all of them trigger the certificate management protocol version 2(CMPv2) procedures at the same time. Operators may want to frequently renew the certificates in order to mitigate any security risks involved by using the certificates for longer durations. If, for example, a certain crypto algorithm is declared as compromised, it is likely that a huge number of network functions (physical and virtual) need to update their certificates.

For systems using certificates as authentication mechanisms for man-to-machine communications, the number of certificates will be directly proportional to the number of users. This could mean a huge number of certificates, and maybe a need to update all of them together. In scenarios when certificates are revoked, in order to avoid any security threats, it is desirable to update and use new certificates as soon as possible. When a new certificate needs to be used, existing secure connections need to be terminated. This may lead to intermittent unavailability of networks.

Automated certificate management facilitates the need for minimum manual intervention, but, can lead to a congestion or overload in the system due to bulk certificate updates happening simultaneously. Such system overload may lead to system un-availabilty, which could be disastrous from operator's revenue point of view.

In order to solve at least part of the above and other potential problems, solutions on certificate updates are proposed. According to embodiments of the present disclosure, a first device receives information of at least one network function. The information at least comprises certificate information of the at least one network function. The first device determines a schedule for triggering certificate update for the at least one network function using an artificial intelligence/machine learning (AI/ML) model on the first device. The first device triggers a certificate update procedure for the at least one network function according to the determined schedule. In this way, it can avoid overload in the system due to bulk certificate updates happening simultaneously.

FIG. 1 illustrates a schematic diagram of a system 100 for certificate update orchestrator in which embodiments of the present disclosure can be implemented. The system 100 comprises a certificate update orchestrator (CUO) 110 at which an AI/ML model can be implemented. The term "AI/ML model" used herein can refer to a program or algorithm that utilizes a set of data that enables it to recognize certain patterns. This allows it to reach a conclusion or make a prediction when provided with sufficient information. Generally, the AI/ML model can be a mathematical algorithm that is "trained" using data and human expert input to replicate a decision an expert would make when provided that same information.

In some example embodiments with open radio access network (ORAN) architecture, the CUO 110 may be an application running in a service management and orchestrator (SMO). In some other embodiments with 3GPP architecture, CUO 110 may be an application running on top of network management system (NMS) or management and orchestration (MANO). In another embodiment with ORAN architecture, the CUO 110 may be an application hosted in O-Cloud.

In some example embodiments, the CUO 110 may monitor and predict time required for updating certificates in various network functions (for example, the network functions 130). The network functions 130 may be physical network functions. Alternatively, the network functions may be virtual network functions. The CUO 110 can maintain an internal database (DB) 1100 where past records of time taken for certificate updates are stored. The DB 1100 may be used to train the AI/ML model for predicting the time required for updating certificates. Alternatively or in addition, the CUO 110 may monitor and predict the need for certificate renewals due to expiry. The CUO 110 may also monitor and predict the need for certificate updates due to revocation.

The CUO 110 may determine a schedule required certificate updated in the network functions 130. In some example embodiments, the schedule may be determined in a manner that neighboring cell(s) do not update the certificates simultaneously. In this way, it can ensure that the connected UEs will have at least one radio link (RL), and end-user service experience is not degraded due to any certificate updates. Moreover, time of initiation of certificate update in every network function can be planned and executed according to this schedule.

The CUO 110 may trigger the network functions 130 to perform certificate update based on the determined schedule. After completing the certificate update procedure, the network functions 130 may transmit a certificate update acknowledgement (ACK) to the CUO 110.

In some example embodiments, the system 100 may also comprise a self-optimizing network (SON) or radio intelligent controller (RIC) 140. In this case, the CUO 110 may coordinate with the SON/RIC 140 in order to increase coverage of neighboring cells when certificate updates are performed on a specific cell. In this way, it can ensure zero impacts on end-user service experience during certificate updates. The SON/RIC 140 may perform coverage coordination for certificate updates with the network functions 130.

Alternatively or in addition, the CUO 110 may also monitor the network performance parameters during the certificate update procedure executions. Moreover, the CUO 110 may reinforce the analytics to derive continuously enhanced scheduling for certificate updates. In some example embodiments, the CUO 110 may monitor the network performance parameters and consider lower network traffic for initiating and scheduling certificate update procedures.

In some example embodiments, the system 100 may comprise a NMS 120 which may comprise an alarm DB 1200. The NMS 120 may transmit network performance measurements to the CUO 110. Additionally, the NMS 120 may transmit an alarm indication certificate about to expire to the CUO 110.

The system 100 may also comprise a certification authority (CA) or registration authority (RA) 150 of an operator. The CA/RA 150 may transmit an announcement about certificate revocation to the CU 110. The network functions 130 may execute certificate update procedure with the CA/RA 150.

In some example embodiments, the system 100 may comprise a certificate revocation list (CRL) or online certificate status protocol (OCSP) DB 160. The CUO 110 may obtain the certificate revocation list from the CRL/OCSP server 160. In some example embodiments, if the network functions 130 are internet of thing (IoT) devices, the CUO 110 may monitor the CRL/OCSP server 160, which can save power.

Figure 2:
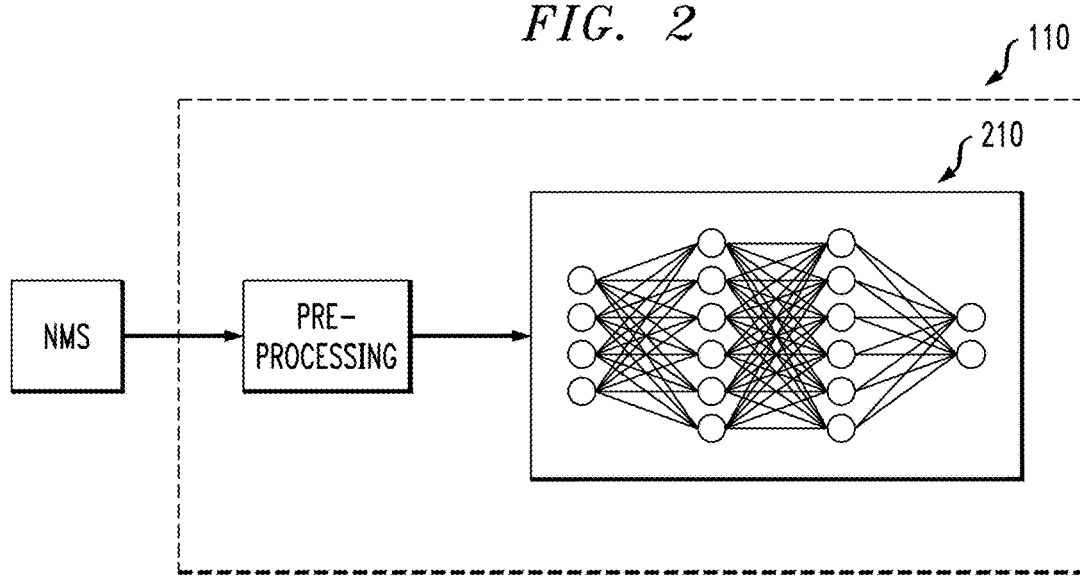
FIG. 2 illustrates a schematic diagram of training an artificial intelligent/machine learning (AI/ML) model at the certificate update orchestrator according to some example embodiments of the present disclosure.

As mentioned above, the AI/ML model can be employed at the CUO 110. Referring to FIG. 2, FIG. 2 illustrates a schematic diagram of training the AI/ML model at the certificate update orchestrator according to some example embodiments of the present disclosure. The AI/ML model 210 may be trained with input data for every network function. For example, the input data may comprise the number of active users in the network function during a predetermine time, for example, "X" days. Alternatively or in addition, the input data may comprise data traffic volume serviced by the network function during the predetermined time. The input data may also comprise a management plane (M-plane) traffic volume serviced by the network function during the predetermined time. In other embodiments, the input data may also comprise remaining time for certificate to expire.

The input data to the AI/ML model 210 can be obtained from the NMS 120. For example, the NMS 120 can provide one or more of: traffic usage, resource utilization, M-plane traffic volume. The NMS 120 may also provide other information as the input to the AI/ML model 210. The information provided by the NMS 120 may be pre-processed in the CUO 110 before inputting to the AI/ML model 210. For example, the CUO 110 may clean up the information from the NMS 120. Alternatively or in addition, the CUO 110 can perform a stationary process on the information from the NMS 120. In some example embodiments, the AI/ML model 210 may be retrained after a set of configurable periodic intervals.

Figure 3:
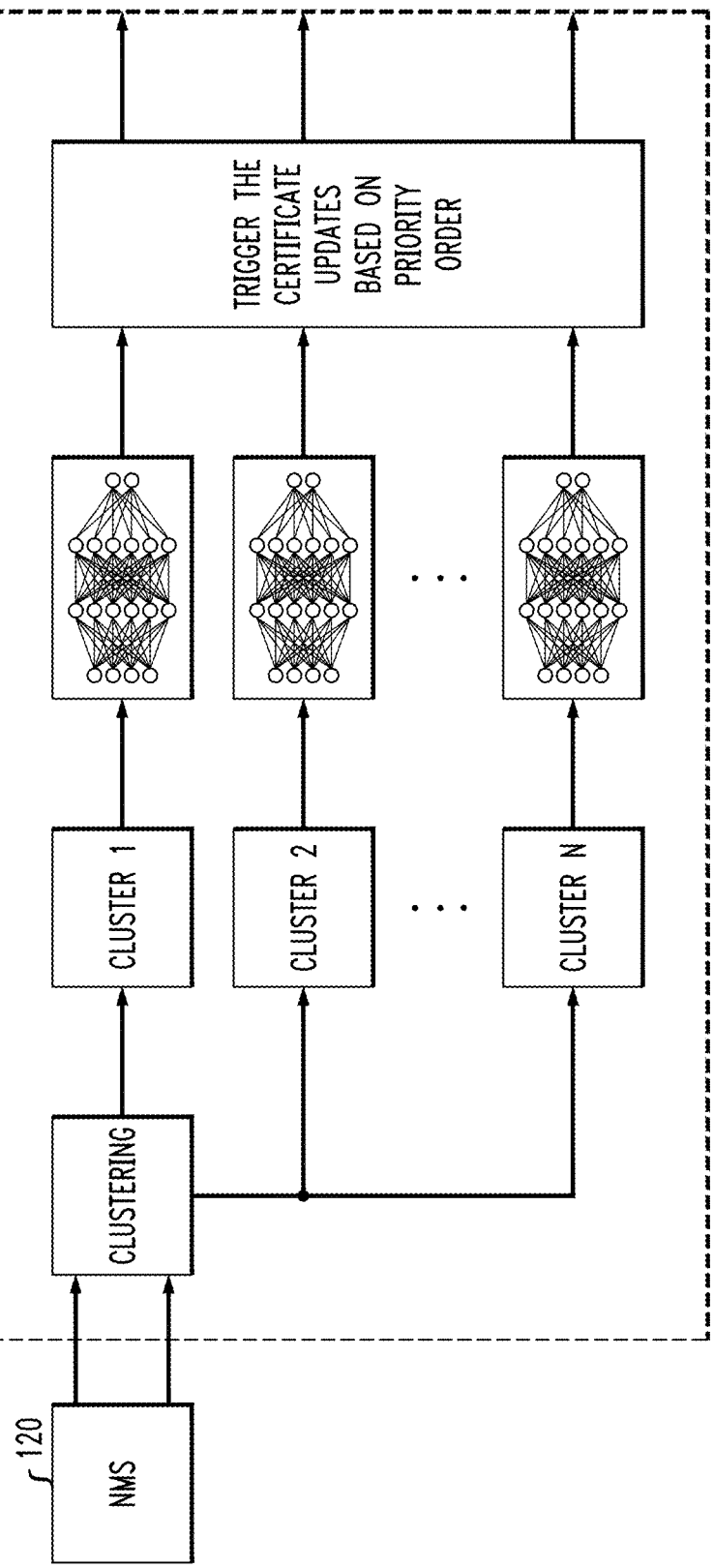
FIG. 3 illustrates a schematic diagram of applying the AI/ML model at the certificate update orchestrator according to some example embodiments of the present disclosure.

As discussed above, the CUO 110 may determine a schedule required certificate updated in the network functions 130. FIG. 3 shows a schematic diagram of applying the AI/ML model at the certificate update orchestrator using the AI/ML model.

As shown in FIG. 3, the NMS 120 can provide alarms indicating remaining time for certificate to expire. The NMS 120 can also provide one or more of: traffic usage, resource utilization, M-plane traffic volume.

The CUO 110 may cluster a set of network functions into subsets based on the remaining time for certificate to expire. For example, the CUO 110 may cluster network functions into groups with similar time remaining for certificate expiry. The CUO 110 may determine prioritization of certificate update procedures based on smallest to largest centroid of the cluster, which statistically represents remaining time to expire for that cluster. For example, the cluster 1 may comprise the group of network functions with least remaining time to expire. The cluster 2 may comprise the group of network functions with second least remaining time to expire. The cluster N may comprise the group of network functions with largest remaining time to expire, where N can be any suitable integer number.

For each cluster, instances of the AI/ML model can derive time window when certificate update can be triggered for respective network functions in this cluster. For example, one or more of the followings of the network functions in cluster 1 can be input to the AI/ML model 210: traffic usage, resource utilization, M-plane traffic volume. The AI/ML model 210 can output time to trigger certificate updates for cluster 1. Similarly, one or more of the followings of the network functions in cluster 2 can be input to the AI/ML model 210: traffic usage, resource utilization, M-plane traffic volume. The AI/ML model 210 can output time to trigger certificate updates for cluster 2. Moreover, one or more of the followings of the network functions in cluster 3 can be input to the AI/ML model 210: traffic usage, resource utilization, M-plane traffic volume. The AI/ML model 210 can output time to trigger certificate updates for cluster 3.

The CUO 110 can trigger the certificate updates based on priority order. For example, the cluster 1 can be with the highest priority and the cluster 2 can be with the lowest priority. In this case, the CUO 110 can firstly trigger the certificate updates for the network functions in the cluster 1. The CUO 1100 can at last trigger the certificate updates for the network functions in the cluster N.

Figure 4:
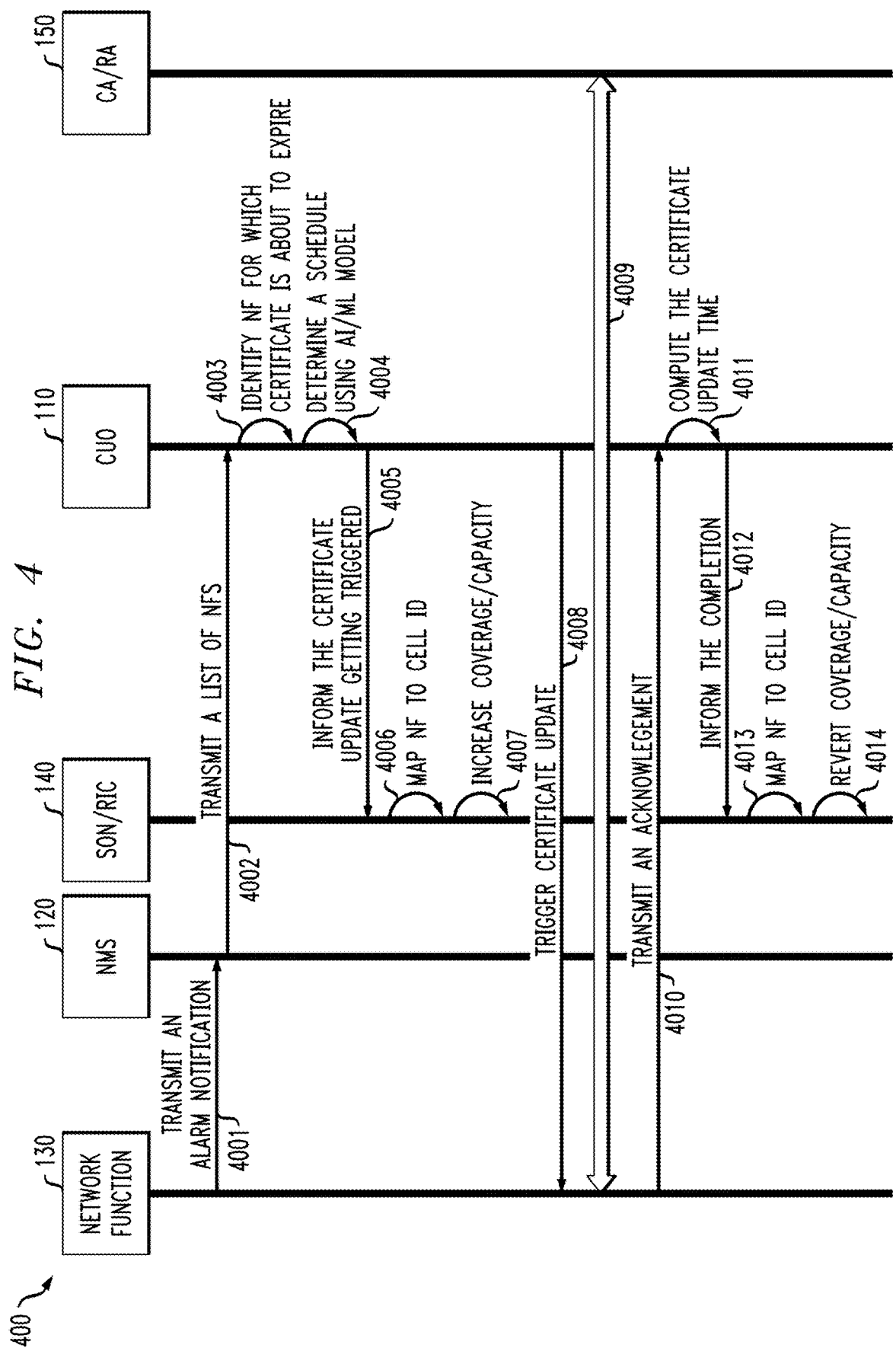
FIG. 4 illustrates a schematic diagram of interactions for certificate updates among entities according to some example embodiments of the present disclosure.

Example embodiments of applying the CUO 110 in difference scenarios are described in detail below with reference to the accompanying drawings. Reference is now made to FIG. 4, which illustrates a signaling flow 400 for certificate updates to example embodiments of the present disclosure. For the purpose of discussion, the signaling flow 400 will be described with reference to FIG. 1. The signaling flow 400 may involve the CUO 110, the NMS 120, the network function 130, the SON/RIC 140 and the CA/RA 150.

The network function 1300 may transmit 4001 an alarm notification to the NMS 120 indicating that a certificate is about to expire. For each network function of which certificate is about to expire, the alarm notification needs to be transmitted to the NMS 120. In some example embodiments, different certificates may expire at different times. Different network functions may trigger multiple alarm notifications depending on the remaining time for expiry. For example, in some example embodiments, a Minor severity alarm may be raised when there is 1 month remaining for expiry, Major severity alarm may be raised for the same certificate when there is 1 week remaining for expiry, and a Critical severity alarm may be raised when there is 1 day remaining for expiry.

The NMS 120 may transmit 4002 a list of network functions for which certificate about to expire alarms have been received. The NMS 120 may also transmit 4002 associated certificate expiry information for the network functions in the list. For example, the associated certificate expiry information may comprise identities of the network functions in the list. Alternatively or in addition, the associated certificate expiry information may comprise a type of certificate. The associated certificate expiry information may also comprise remaining time to expire. In some example embodiments, the NMS 120 may transmit consolidated information which can be a table with the list of network functions and respective certificate expiry information.

The CUO 110 may identify 4003 network functions of which certificates are about to expire simultaneously. For example, the CUO 110 may sort the received information by identifying NFs for which the remaining time for expiry is same or similar. In some example embodiments, the CUO 110 can apply clustering in order to obtain groups of cells having similar remaining time for certificate expiry. The CUO can apply the AI/ML model 210 to determine an optimum schedule for certificate updates for various network functions. The AI/ML 210 can be trained to consider: remaining time for certificate expiry; statistical analysis of time taken to update certificates in various network functions; network traffic when certificate update window is available. With above mentioned features, the AI/ML 210 can infer an optimum time window for scheduling certificate updates in the network functions.

The CUO 110 may inform 4005 the SON/RIC 140 about the certificate update getting triggered for a particular NE The SON/RIC may map 4006 the network function to one or more associated cell ID(s).

The SON/RIC 140 may identify neighbors of the cell ID(s) of the associated cell ID using neighbor cell relations (NCRs). The SON/RIC 140 may increase 4007 the coverage or capacity of neighboring cells, anticipating a downtime during certificate update procedure. In this way, the end-user service experience is not degraded due to any certificate updates.

The CUO 110 may trigger 4008 a certificate update procedure towards the network function 130. In some example embodiments, CUO may trigger the certificate update procedure after receiving an acknowledgement from SON/RIC 140.

The network function 130 may execute 4009 the certificate update procedure with the CA/RA 150 of the operator. The network function 130 may transmit 4010 an acknowledgment of the completion of certificate update procedure to the CUO 110.

The CUO 110 may compute 4011 certificate update time and update it in the DB 1100. In this way, it allows the CUO 110 to improve the AI/ML model continuously. The CUO 110 may inform 4012 the completion of certificate update procedure to the SON/RIC 140.

The SON/RIC 140 may map 4013 the network function to cell ID(s). The SON/RIC 140 may revert 4014 the coverage/capacity. For example, the SON/RIC 140 may revert the coverage/capacity to the condition which was before the incensement 4007. Steps 4005-4014 can be repeated for each network function.

According to embodiments described with reference to FIG. 4, an optimum time window for scheduling certificate updates in the network functions can be used and the end-user service experience is not degraded due to any certificate updates.

Figure 5:
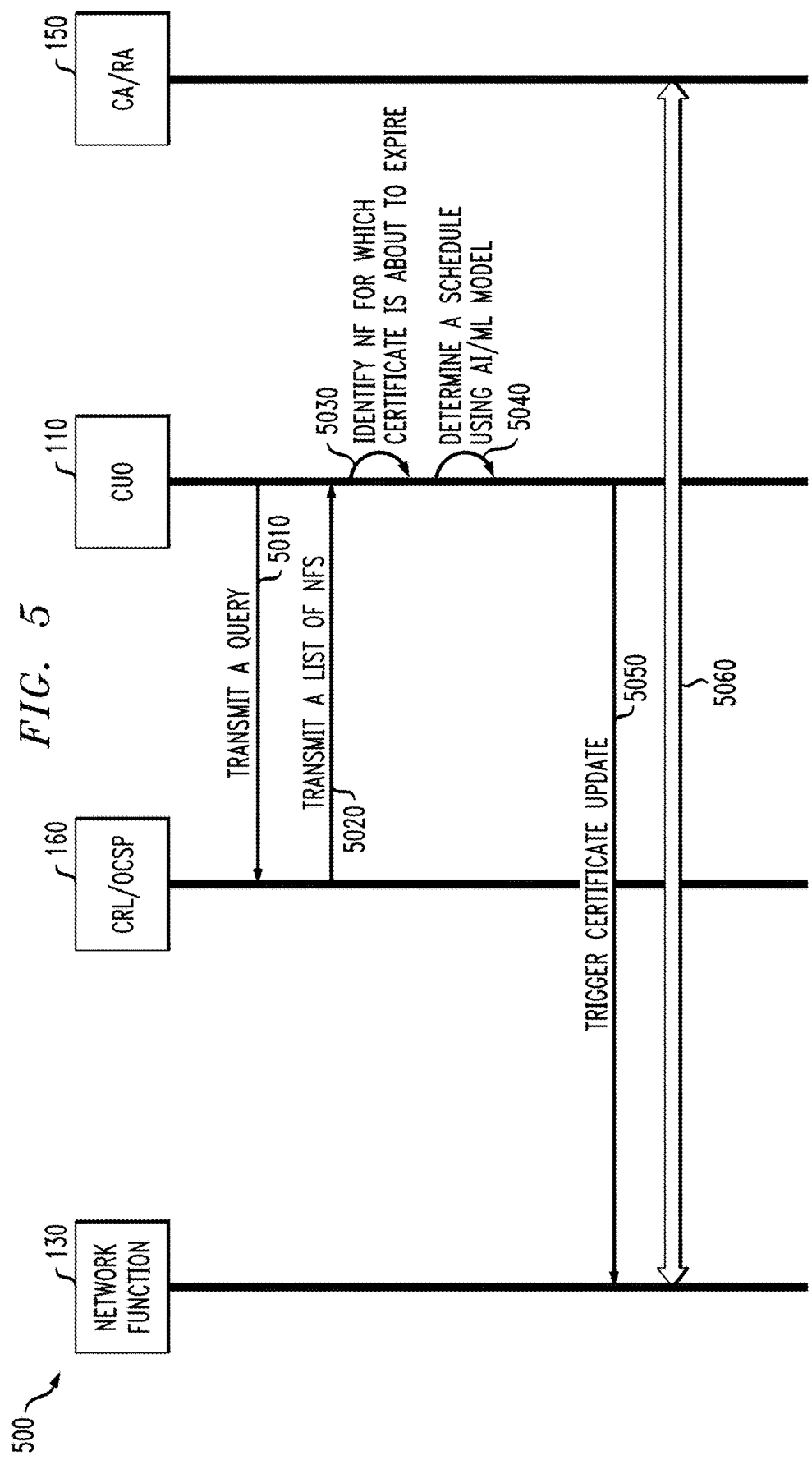
FIG. 5 illustrates a schematic diagram of interactions for certificate updates among entities according to some example embodiments of the present disclosure.

FIG. 5 illustrates a signaling flow 500 where CUO takes care of staggering the certificate updates, if required due to revocation, according to example embodiments of the present disclosure. The operator needs to configure the CRL and/or OCSP URL (location) in the CUO 110.

The CUO 110 may transmit 5010 a query to the CRL/OCSP server 160. The CRL/OCSP server 160 may transmit 5020 a list of network functions. The list of network functions may be the latest certificate revocation list.

The CUO 110 may identify 5030 the network functions of which certificates are revoked. The CUO may determine 5040 a staggered schedule for certificate update of the network functions. In this case, if certificates used by the network functions are revoked, the staggered certificate update can ensure that the certificate update procedure does not overload the system.

In some example embodiments, the CUO 110 may inform the SON/RIC 140 about the certificate update getting triggered for a particular NF. The SON/RIC may map the network function to one or more associated cell ID(s). The SON/RIC 140 may identify neighbors of the cell ID(s) of the associated cell ID using neighbor cell relations (NCRs). The SON/RIC 140 may increase the coverage or capacity of neighboring cells, anticipating a downtime during certificate update procedure. In this way, the end-user service experience is not degraded due to any certificate updates.

The CUO 110 may trigger 5050 a certificate update procedure towards the network function 130. In some example embodiments, CUO may trigger the certificate update procedure after receiving an acknowledgement from SON/RIC 140. The network function 130 may execute 5060 the certificate update procedure with the CA/RA 150 of the operator.

In some example embodiments, the network function 130 may transmit an acknowledgment of the completion of certificate update procedure to the CUO 110. The CUO 110 may compute certificate update time and update it in the DB 1100. In this way, it allows the CUO 110 to improve the AI/ML model continuously. The CUO 110 may inform the completion of certificate update procedure to the SON/RIC 140. The SON/RIC 140 may map the network function to cell ID(s). The SON/RIC 140 may revert the coverage/capacity. For example, the SON/RIC 140 may revert the coverage/capacity to the condition which was before the incensement. Steps 5010-5040 can be repeated for periodic monitoring CRL/OCSP. Steps 5050 and 5060 can be repeated for each network function of which the certificate update is needed.

According to embodiments described with reference to FIG. 5, it can be advantageous for network functions, especially mobile and IoT devices, in terms of saving energy and periodic communications with CRL/OCSP servers. Moreover, the CUO 110 being centralized entity can stagger the certificate updates in order to prevent bulk certificate updates overloading the PKI and/or the communications systems. Further, the CUO 110 may coordinate with SON/RIC in order to ensure zero impacts on end user experience.

Figure 6:
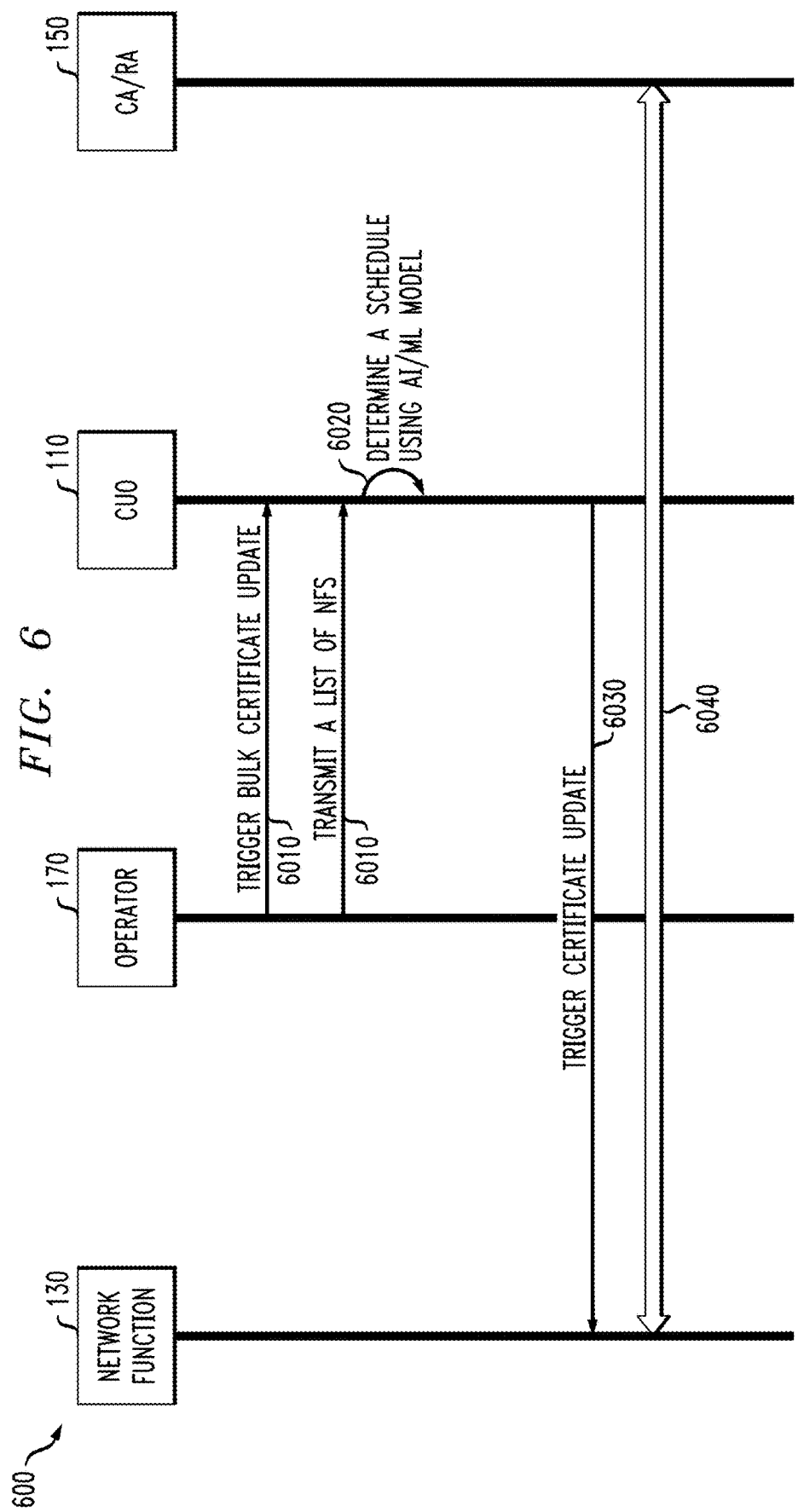
FIG. 6 illustrates a schematic diagram of interactions for certificate updates among entities according to some example embodiments of the present disclosure.

FIG. 6 illustrates a signaling flow 600 where operator or an automation function triggers a bulk certificate update according to example embodiments of the present disclosure. Operator or automation function may need to do so in scenarios when Certificate keys or algorithms need to be updated in all the deployments.

The operator 170 may trigger 6010 a bulk certificate update in a large number of network functions. The operator 170 may transmit 6015 a list of network functions and detail information of certificates to be updated.

The CUO may determine 6020 a staggered schedule for certificate update of the network functions. In this case, if certificates used by the network functions are revoked, the staggered certificate update can ensure that the certificate update procedure does not overload the system.

In some example embodiments, the CUO 110 may inform the SON/RIC 140 about the certificate update getting triggered for a particular NF. The SON/RIC may map the network function to one or more associated cell ID(s). The SON/RIC 140 may identify neighbors of the cell ID(s) of the associated cell ID using neighbor cell relations (NCRs). The SON/RIC 140 may increase the coverage or capacity of neighboring cells, anticipating a downtime during certificate update procedure. In this way, the end-user service experience is not degraded due to any certificate updates.

The CUO 110 may trigger 6030 a certificate update procedure towards the network function 130. In some example embodiments, CUO may trigger the certificate update procedure after receiving an acknowledgement from SON/RIC 140. The network function 130 may execute 6040 the certificate update procedure with the CA/RA 150 of the operator.

In some example embodiments, the network function 130 may transmit an acknowledgment of the completion of certificate update procedure to the CUO 110. The CUO 110 may compute certificate update time and update it in the DB 1100. In this way, it allows the CUO 110 to improve the AI/ML model continuously. The CUO 110 may inform the completion of certificate update procedure to the SON/RIC 140. The SON/RIC 140 may map the network function to cell ID(s). The SON/RIC 140 may revert the coverage/capacity. For example, the SON/RIC 140 may revert the coverage/capacity to the condition which was before the incensement. Steps 6030 and 6040 can be repeated for each network function of which the certificate update is needed.

According to embodiments described with reference to FIG. 6, the CUO 110 ensures that such a bulk certificate update does not lead to overloading the PKI or communication system by staggering the updates in various network functions. Further, the CUO 110 may coordinate with SON/RIC in order to ensure zero impacts on end user experience.

Figure 7:
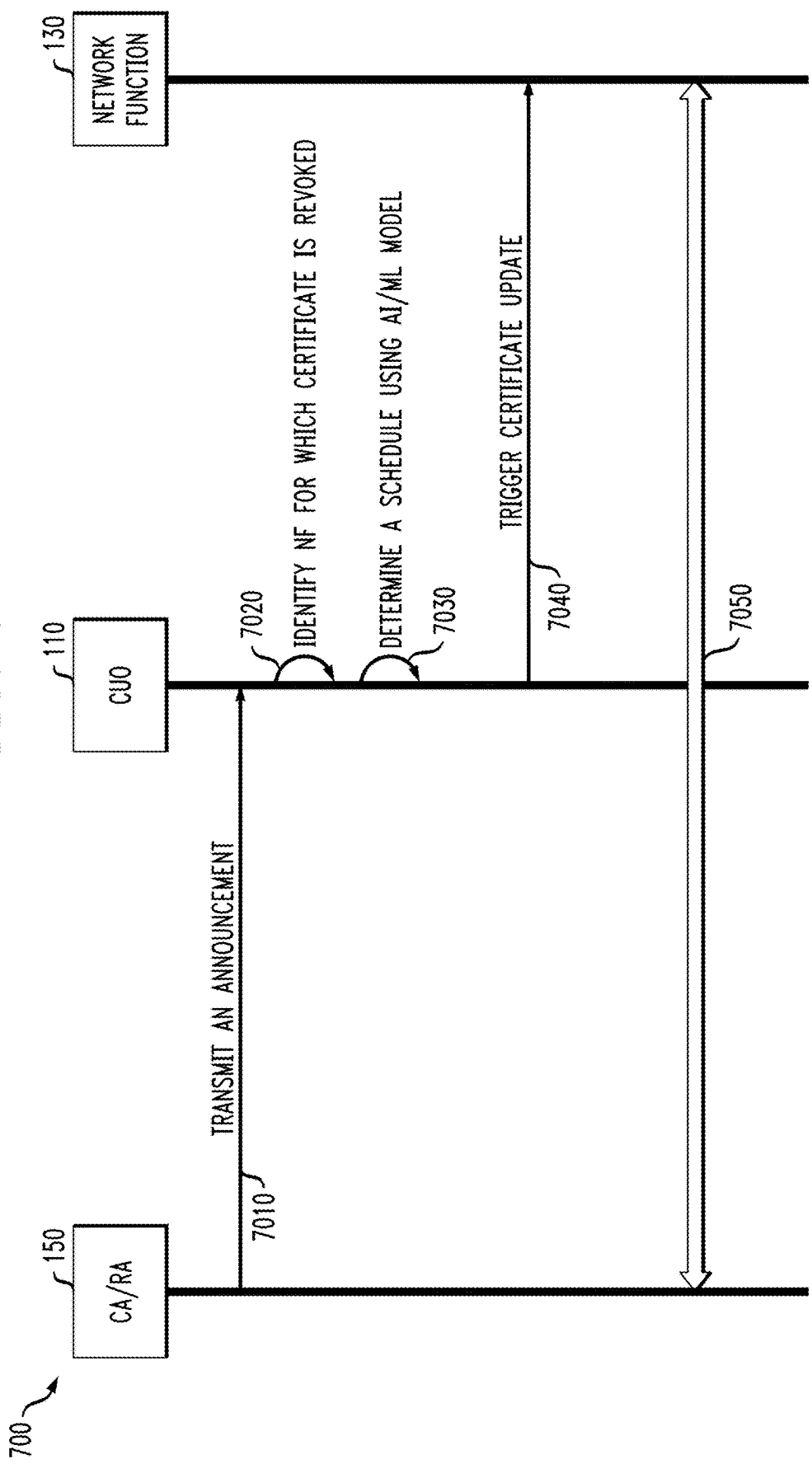
FIG. 7 illustrates a schematic diagram of interactions for certificate updates among entities according to some example embodiments of the present disclosure.

FIG. 7 illustrates a signaling flow 700 where CA announces a certificate revocation according to example embodiments of the present disclosure. Operator or automation function may need to do so in scenarios when Certificate keys or algorithms need to be updated in all the deployments.

The CA/RA 150 may transmit 7010 an announcement about revoked certificates to the CUO 110. The CUO 110 may identify 7020 the network functions of which certificates are revoked. The CUO may determine 7030 a staggered schedule for certificate update of the network functions. In this case, if certificates used by the network functions are revoked, the staggered certificate update can ensure that the certificate update procedure does not overload the system.

In some example embodiments, the CUO 110 may inform the SON/RIC 140 about the certificate update getting triggered for a particular NF. The SON/RIC may map the network function to one or more associated cell ID(s). The SON/RIC 140 may identify neighbors of the cell ID(s) of the associated cell ID using neighbor cell relations (NCRs). The SON/RIC 140 may increase the coverage or capacity of neighboring cells, anticipating a downtime during certificate update procedure. In this way, the end-user service experience is not degraded due to any certificate updates.

The CUO 110 may trigger 7040 a certificate update procedure towards the network function 130. In some example embodiments, CUO may trigger the certificate update procedure after receiving an acknowledgement from SON/RIC 140. The network function 130 may execute 7050 the certificate update procedure with the CA/RA 150 of the operator.

In some example embodiments, the network function 130 may transmit an acknowledgment of the completion of certificate update procedure to the CUO 110. The CUO 110 may compute certificate update time and update it in the DB 1100. In this way, it allows the CUO 110 to improve the AI/ML model continuously. The CUO 110 may inform the completion of certificate update procedure to the SON/RIC 140. The SON/RIC 140 may map the network function to cell ID(s). The SON/RIC 140 may revert the coverage/capacity. For example, the SON/RIC 140 may revert the coverage/capacity to the condition which was before the incensement. Steps 6030 and 6040 can be repeated for each network function of which the certificate update is needed.

According to embodiments described with reference to FIG. 7, the CA may announce revocation of certificates. It is likely that such revoked certificates affect many network functions simultaneously. Further, the CUO 110 may coordinate with SON/RIC in order to ensure zero impacts on end user experience.

It should be noted that embodiments described with reference to the above figures can be combined in any proper manner. Embodiments described with reference to the above figures can also be implemented separately.

Figure 8:
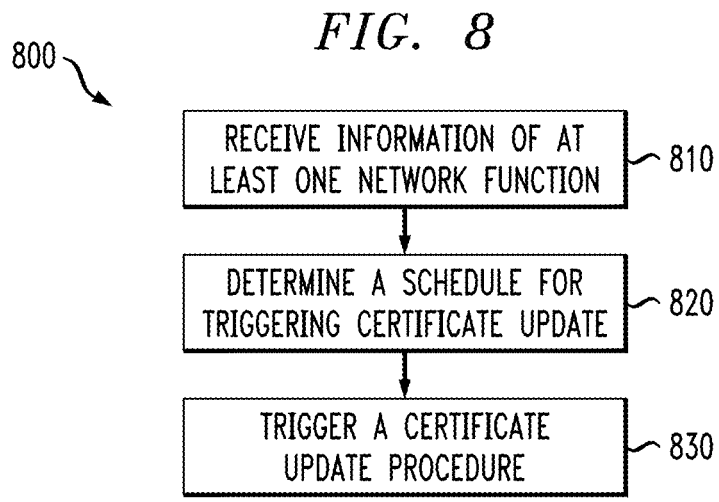
FIG. 8 illustrates a flowchart of a method implemented at a first apparatus according to some example embodiments of the present disclosure.

FIG. 8 illustrates a flowchart of a method 800 implemented at a first device according to some example embodiments of the present disclosure. For example, the first device may be the CUO 110 shown in FIG. 1.

At block 810, the first device receives information of at least one network function. The information at least comprises certificate information of the at least one network function. In some example embodiments, the first device may receive the information of a set of network functions. In this case, the first device may divide the set of network functions into a plurality of subsets of network functions based on the certificate information. The network functions in one subset of network functions can have remaining time for certificate to expire which is within a predetermined range. In some example embodiments, the information may also comprise traffic information of the set of network functions.

In some example embodiments, the first device may receive the information of the set of network functions from a second device, for example, the NMS. The information may comprise one or more of: identities of the set of network functions, one or more types of certificate corresponding to the set of network functions, remaining time to expire of network functions in the set of network functions.

At block 820, the first device determines a schedule for triggering certificate update for the at least one network function using an artificial intelligence/machine learning (AI/ML) model on the first device. In some example embodiments, as mentioned above, the set of network functions may be divided into a plurality of subsets of network functions based on the certificate information. In this case, the first device may determine the schedule for triggering certificate update for each subset of network functions using the AI/ML model on the first device. In some example embodiments, the first device may determine the schedule for triggering certificate update based on the traffic information using the AI/ML model on the first device.

At block 830, the first device triggers a certificate update procedure for the at least one network function according to the determined schedule. In some example embodiments, the first device may transmit to a third device an indication regarding a certificate of the at least one network function to be updated. The third device may be a SON/RIC.

In some example embodiments, the first device may receive from the at least one network function an acknowledgment of a completion of the certificate update procedure. In this case, in some example embodiments, the first device may inform the third device regarding the completion of the certificate update procedure. The first device may also determine certificate update time for the at least one network function based on the reception of the acknowledgement. The first device may update the AI/ML model based on the determined certificate update time.

In some example embodiments, the first device may train the AI/ML model with at least one of: the number of active users in the at least one network function during predetermined time, data traffic volume serviced by the at least one network function during the predetermined time, a management plane traffic volume serviced by the at least one network function during the predetermined time, or remaining time for certificate to expire of the at least one network function.

Alternatively or in addition, the first device may transmit to a fourth device a query for a certificate revocation list. The fourth device may be a CRL/OSCP. The first device may then receive from the fourth device the certificate revocation list. The first device may also identify the at least one network function of which certificate is revoked based on the certificate revocation list. In this case, the first device may determine a staggered certificate update schedule for the at least one network function using the AI/ML model on the first device.

In some example embodiments, the first device may receive from a fifth device a list of network functions. The fifth device may be an operator. The list of network functions may comprise a set of network functions and information of certificates to be updated. In this case, the first device may determine a staggered certificate update schedule for the set of network functions using the AI/ML model on the first device.

In some other embodiments, the first device may receive an announcement about revoked certificates from a sixth device. The sixth device may be a CA. The first device may identify the at least one network function of which certificate is revoked based on the announcement. In this case, the first device may determine a staggered certificate update schedule for the at least one network function using the AI/ML model.

Figure 9:
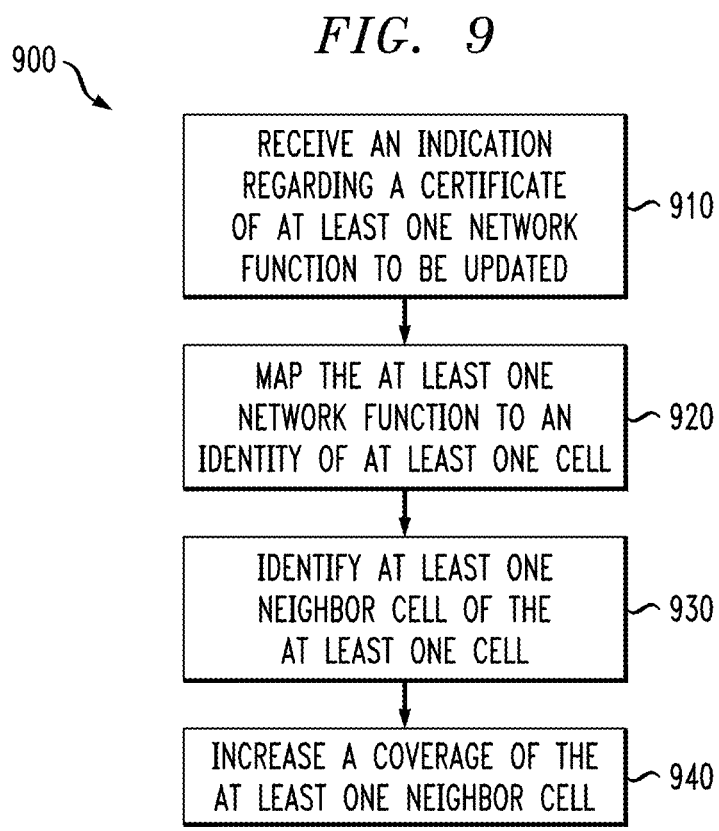
FIG. 9 illustrates a flowchart of a method implemented at a third apparatus according to some example embodiments of the present disclosure.

FIG. 9 illustrates a flowchart of a method 900 implemented at a third device according to some example embodiments of the present disclosure. For example, the third device may be the SON/RIC 140 shown in FIG. 1.

At block 910, the third device receives from a first device an indication regarding a certificate of at least one network function to be updated.

At block 920, the third device maps the at least one network function to an identity of at least one cell. The third device may map the network function to one or more associated cell ID(s).

At block 930, the third device identifies at least one neighbor cell of the at least one cell. For example, the third device may identify neighbors of the cell ID(s) of the associated cell ID using neighbor cell relations (NCRs).

At block 940, the third device increases a coverage of the at least one neighbor cell. Alternatively, the third device may increase a capacity of the at least one neighbor cell. In this way, the end-user service experience is not degraded due to any certificate updates.

In some example embodiments, a first apparatus capable of performing any of the method 800 (for example, the first device) may comprise means for performing the respective operations of the method 800. The means may be implemented in any suitable form. For example, the means may be implemented in a circuitry or software module. The first apparatus may be implemented as or included in the first device. In some example embodiments, the means may comprise at least one processor and at least one memory including computer program code. The at least one memory and computer program code are configured to, with the at least one processor, cause performance of the first apparatus.

In some example embodiments, the first apparatus comprises means for receiving, at a first device, information of at least one network function, the information at least comprising certificate information of the at least one network function; means for determining a schedule for triggering certificate update for the at least one network function using an artificial intelligence/machine learning (AI/ML) model on the first device; and means for triggering a certificate update procedure for the at least one network function according to the determined schedule.

In some example embodiments, the means for receiving information of the at least one network function comprises: means for receiving the information of a set of network functions. In some example embodiments, the first apparatus comprises means for dividing the set of network functions into a plurality of subsets of network functions based on the certificate information, network functions in one subset of network functions having remaining time for certificate to expire which is within a predetermined range; and means for determining the schedule for triggering certificate update for each subset of network functions using the AI/ML model on the first device.

In some example embodiments, the information further comprises traffic information of the set of network functions. In some example embodiments, the means for determining the schedule for triggering certificate update comprises: means for determining the schedule for triggering certificate update based on the traffic information using the AI/ML model on the first device.

In some example embodiments, the means for receiving the information of the set of network functions comprises: means for receiving the information of the set of network functions from a second device, the information comprising at least one of: identities of the set of network functions, one or more types of certificate corresponding to the set of network functions, remaining time to expire of network functions in the set of network functions.

In some example embodiments, the first apparatus comprises means for transmitting to a third device an indication regarding a certificate of the at least one network function to be updated.

In some example embodiments, the first apparatus comprises means for receiving from the at least one network function an acknowledgment of a completion of the certificate update procedure; and means for informing the third device regarding the completion of the certificate update procedure.

In some example embodiments, the first apparatus comprises means for determining certificate update time for the at least one network function based on the reception of the acknowledgement; and means for updating the AI/ML model based on the determined certificate update time.

In some example embodiments, the first apparatus comprises means for training the AI/ML model with at least one of: the number of active users in the at least one network function during predetermined time, data traffic volume serviced by the at least one network function during the predetermined time, a management plane traffic volume serviced by the at least one network function during the predetermined time, or remaining time for certificate to expire of the at least one network function.

In some example embodiments, the first apparatus comprises means for transmitting to a fourth device a query for a certificate revocation list; means for receiving from the fourth device the certificate revocation list; means for identifying the at least one network function of which certificate is revoked based on the certificate revocation list. In some example embodiments, the means for determining the schedule for triggering certificate update comprises: means for determining a staggered certificate update schedule for the at least one network function using the AI/ML model on the first device.

In some example embodiments, the first apparatus comprises means for receiving from a fifth device a list of network functions comprising a set of network functions and information of certificates to be updated. In some example embodiments, the means for determining the schedule for triggering certificate update comprises: means for determining a staggered certificate update schedule for the set of network functions using the AI/ML model on the first device.

In some example embodiments, the first apparatus comprises means for receiving from a sixth device an announcement about revoked certificates; means for identifying the at least one network function of which certificate is revoked based on the announcement. In some example embodiments, the means for determining the schedule for triggering certificate update comprises: means for determining a staggered certificate update schedule for the at least one network function using the AI/ML model.

In some example embodiments, the first device comprises a certificate update orchestrator, the second device comprises a network management system, the third device comprises a self-optimizing network entity or a radio intelligent controller, the fourth device comprises a certificate revocation list server or an online certificate status protocol server, the fifth device comprises an operator or an automation function, and the sixth device comprises a certification authority entity.

In some example embodiments, a second apparatus capable of performing any of the method 900 (for example, the second device) may comprise means for performing the respective operations of the method 900. The means may be implemented in any suitable form. For example, the means may be implemented in a circuitry or software module. The second apparatus may be implemented as or included in the second device. In some example embodiments, the means may comprise at least one processor and at least one memory including computer program code. The at least one memory and computer program code are configured to, with the at least one processor, cause performance of the second apparatus.

In some example embodiments, the second apparatus comprises means for receiving, at a third device and from a first device an indication regarding a certificate of at least one network function to be updated; means for mapping the at least one network function to an identity of at least one cell; means for identifying at least one neighbor cell of the at least one cell; and means for increasing a coverage of the at least one neighbor cell.

In some example embodiments, the second apparatus comprises means for increasing a capacity of the at least one neighbor cell.

In some example embodiments, the first device comprises a certificate update orchestrator, and the third device comprises a self-optimizing network entity or a radio intelligent controller.

Figure 10:
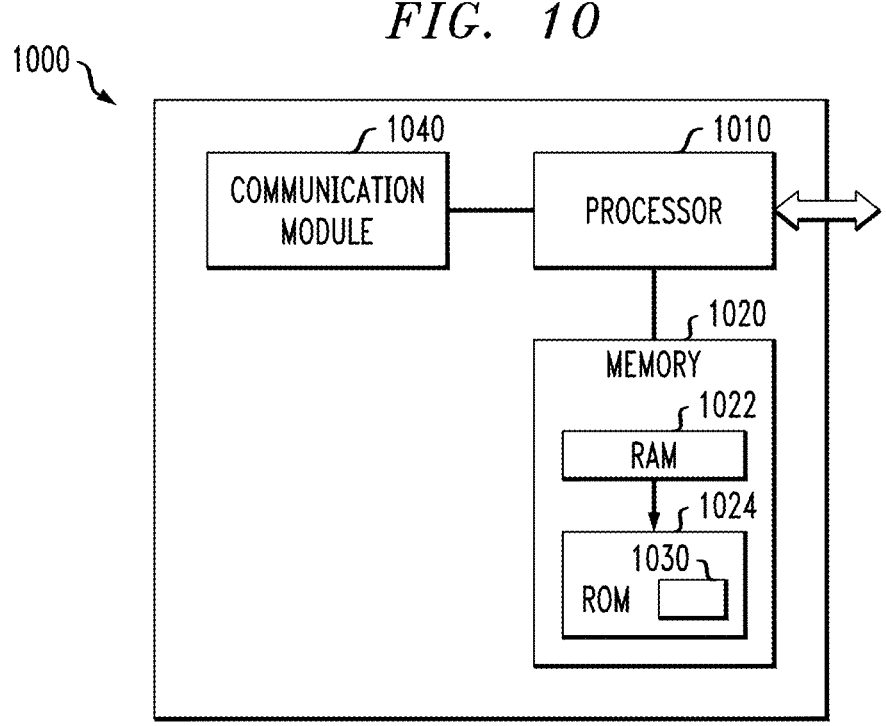
FIG. 10 illustrates a simplified block diagram of an apparatus that is suitable for implementing example embodiments of the present disclosure.

FIG. 10 is a simplified block diagram of a device 1000 that is suitable for implementing example embodiments of the present disclosure. The device 1000 may be provided to implement a communication device, for example, the CUO 110 or the SON/RIC 140 as shown in FIG. 1. As shown, the device 1000 includes one or more processors 1010, one or more memories 1020 coupled to the processor 1010, and one or more communication modules 1040 coupled to the processor 1010.

The communication module 1040 is for bidirectional communications. The communication module 1040 has one or more communication interfaces to assist with communication with one or more other modules or devices. The communication interfaces may represent any interface that is necessary for communication with other network elements. In some example embodiments, the communication module 1040 may include at least one antenna.

The processor 1010 may be of any type suitable to the local technical network and may include one or more of the following: general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

The memory 1020 may include one or more non-volatile memories and one or more volatile memories. Examples of the non-volatile memories include, but are not limited to, a Read Only Memory (ROM) 1024, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 1022 and other volatile memories that will not last in the power-down duration.

A computer program 1030 includes computer executable instructions that are executed by the associated processor 1010. The program 1030 may be stored in the memory, e.g., ROM 1024. The processor 1010 may perform any suitable actions and processing by loading the program 1030 into the RAM 1022.

Example embodiments of the present disclosure may be implemented by means of the program 1030 so that the device 1000 may perform any process of the disclosure as discussed with reference to FIGS. 1 to 9. The example embodiments of the present disclosure may also be implemented by hardware or by a combination of software and hardware.

Figure 11:
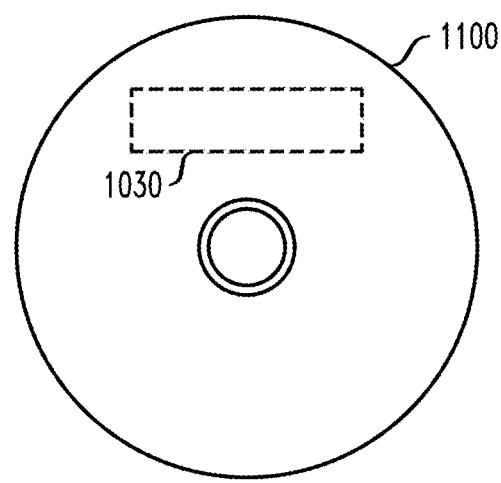
FIG. 11 illustrates a block diagram of an example computer readable medium in accordance with some example embodiments of the present disclosure.

In some example embodiments, the program 1030 may be tangibly contained in a computer readable medium which may be included in the device 1000 (such as in the memory 1020) or other storage devices that are accessible by the device 1000. The device 1000 may load the program 1030 from the computer readable medium to the RAM 1022 for execution. The computer readable medium may include any types of tangible non-volatile storage, such as ROM, EPROM, a flash memory, a hard disk, CD, DVD, and other magnetic storage and/or optical storage. FIG. 11 shows an example of the computer readable medium 1100 in form of an optical storage disk. The computer readable medium has the program 1030 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIGS. 1 to 9. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
   at least one processor; and
   at least one memory including computer program code;
   the at least one memory and the computer program code are configured to, with the at least one processor, cause the first device to:
   receive information of at least one network function, the information at least comprising certificate information of the at least one network function, the at least one network function being part of a first network cell of a communication network;
   determine one or more additional network cells of the communication network neighboring the first network cell;
   determine a schedule for triggering certificate update for the at least one network function using an artificial intelligence/machine learning (AI/ML) model on the first device, the determined schedule coordinating a time of initiation of a certificate update procedure for the at least one network function in the first network cell with times of initiation of certificate update procedures for one or more other network functions in the one or more additional network cells that neighbor the first network cell based at least in part on a predicted time required for the certificate update procedure for the at least one network function in the first network cell such that the certificate update procedure for the at least one network function is not performed at a same time as certificate update procedures for the one or more other network functions in the one or more additional network cells that neighbor the first network cell; and
   trigger the certificate update procedure for the at least one network function in the first network cell according to the determined schedule.

2. The first device of claim 1, wherein the at least one memory and the computer program code are configured to, with the at least one processor, cause the first device to receive information of the at least one network function by:
   receiving the information of a set of network functions; and
   wherein the at least one memory and the computer program code are configured to, with the at least one processor, cause the first device to:
   divide the set of network functions into a plurality of subsets of network functions based on the certificate information, network functions in one subset of network functions having remaining time for certificate to expire which is within a predetermined range; and
   determine the schedule for triggering certificate update for each subset of network functions using the AI/ML model on the first device.

3. The first device of claim 2, wherein the information of the set of network functions further comprises traffic information of the set of network functions, and
   wherein the at least one memory and the computer program code are configured to, with the at least one processor, cause the first device to determine the schedule for triggering certificate update by:
   determining the schedule for triggering certificate update based on the traffic information using the AI/ML model on the first device.

4. The first device of claim 2, wherein the at least one memory and the computer program code are configured to, with the at least one processor, cause the first device to receive the information of the set of network functions by:

receiving the information of the set of network functions from a second device, the information comprising at least one of: identities of the set of network functions, one or more types of certificate corresponding to the set of network functions, remaining time to expire of network functions in the set of network functions.

5. The first device of claim 1, wherein the at least one memory and the computer program code are configured to, with the at least one processor, cause the first device to:
transmit to a third device an indication regarding a certificate of the at least one network function to be updated.

6. The first device of claim 5, wherein the at least one memory and the computer program code are configured to, with the at least one processor, cause the first device to:
receive from the at least one network function an acknowledgement of a completion of the certificate update procedure; and
inform the third device regarding the completion of the certificate update procedure.

7. The first device of claim 6, wherein the at least one memory and the computer program code are configured to, with the at least one processor, cause the first device to:
determine certificate update time for the at least one network function based on the reception of the acknowledgement; and
update the AI/ML model based on the determined certificate update time.

8. The first device of claim 1, wherein the at least one memory and the computer program code are configured to, with the at least one processor, cause the first device to:
train the AI/ML model with at least one of:
a number of active users in the at least one network function during a predetermined time,
data traffic volume serviced by the at least one network function during the predetermined time,
a management plane traffic volume serviced by the at least one network function during the predetermined time, or
remaining time for certificate to expire of the at least one network function.

9. The first device of claim 1, wherein the at least one memory and the computer program code are configured to, with the at least one processor, cause the first device to:
transmit to a fourth device a query for a certificate revocation list;
receive from the fourth device the certificate revocation list;
identify the at least one network function of which certificate is revoked based on the certificate revocation list; and
wherein the at least one memory and the computer program code are configured to, with the at least one processor, cause the first device to determine the schedule for triggering certificate update by:
determining a staggered certificate update schedule for the at least one network function using the AI/ML model on the first device.

10. The first device of claim 1, wherein the at least one memory and the computer program code are configured to, with the at least one processor, cause the first device to:
receive from a fifth device a list of network functions comprising a set of network functions and information of certificates to be updated;
wherein the at least one memory and the computer program code are configured to, with the at least one processor, cause the first device to determine the schedule for triggering certificate update by:
determining a staggered certificate update schedule for the set of network functions using the AI/ML model on the first device.

11. The first device of claim 1, wherein the at least one memory and the computer program code are configured to, with the at least one processor, cause the first device to:
receive from a sixth device an announcement about revoked certificates;
identify the at least one network function of which certificate is revoked based on the announcement; and
wherein the at least one memory and the computer program code are configured to, with the at least one processor, cause the first device to determine the schedule for triggering certificate update by:
determining a staggered certificate update schedule for the at least one network function using the AI/ML model.

12. A method comprising:
receiving, at a first device, information of at least one network function, the information at least comprising certificate information of the at least one network function, the at least one network function being part of a first network cell of a communication network;
determining one or more additional network cells of the communication network neighboring the first network cell;
determining a schedule for triggering certificate update for the at least one network function in the first network cell using an artificial intelligence/machine learning (AI/ML) model on the first device, the determined schedule coordinating a time of initiation of a certificate update procedure for the at least one network function in the first network cell with times of initiation of certificate update procedures for one or more other network functions in the one or more additional network cells that neighbor the first network cell, based at least in part on a predicted time required for the certificate update procedure for the at least one network function in the first network cell, such that the certificate update procedure for the at least one network function is not performed at a same time as certificate update procedures for at least one of the one or more other network functions in the one or more additional network cells that neighbor the first network cell; and
triggering the certificate update procedure for the at least one network function in the first network cell according to the determined schedule.

13. The method of claim 12, wherein receiving information of the at least one network function comprises:
receiving the information of a set of network functions; and
wherein the method further comprises:
dividing the set of network functions into a plurality of subsets of network functions based on the certificate information, network functions in one subset of network functions having remaining time for certificate to expire which is within a predetermined range; and
determining the schedule for triggering certificate update for each subset of network functions using the AI/ML model on the first device.

14. The method of claim 13, wherein the information of the set of network functions further comprises traffic information of the set of network functions, and wherein determining the schedule for triggering certificate update comprises:
determining the schedule for triggering certificate update based on the traffic information using the AI/ML model on the first device.

15. The method of claim 13, wherein receiving the information of the set of network functions comprises:
receiving the information of the set of network functions from a second device, the information comprising at least one of: identities of the set of network functions, one or more types of certificate corresponding to the set of network functions, remaining time to expire of network functions in the set of network functions.

16. The method of claim 12, further comprising:
transmitting to a third device an indication regarding a certificate of the at least one network function to be updated.

17. The method of claim 12, further comprising:
training the AI/ML model with at least one of:
  a number of active users in the at least one network function during a predetermined time,
  data traffic volume serviced by the at least one network function during the predetermined time,
  a management plane traffic volume serviced by the at least one network function during the predetermined time, or
  remaining time for certificate to expire of the at least one network function.

18. The method of claim 12, further comprising:
transmitting to a fourth device a query for a certificate revocation list;
receiving from the fourth device the certificate revocation list;
identifying the at least one network function of which certificate is revoked based on the certificate revocation list; and
wherein determining the schedule for triggering certificate update comprises:
determining a staggered certificate update schedule for the at least one network function using the AI/ML model on the first device.

19. The method of claim 12, further comprising:
receiving from a fifth device a list of network functions comprising a set of network functions and information of certificates to be updated;
wherein determining the schedule for triggering certificate update comprises:
determining a staggered certificate update schedule for the set of network functions using the AI/ML model on the first device.

* * * * *